United States Patent
Erickson et al.

(10) Patent No.: US 6,541,553 B1
(45) Date of Patent: Apr. 1, 2003

(54) FORMULATION FOR STRIPPABLE ADHESIVE AND COATING FILMS AND HIGH PERFORMANCE ADHESIVE

(75) Inventors: James Robert Erickson, Katy, TX (US); David Romme Hansen, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/690,523

(22) Filed: Oct. 17, 2000

Related U.S. Application Data

(60) Provisional application No. 60/160,032, filed on Oct. 18, 1999.

(51) Int. Cl.$^7$ .................................................. C08K 3/00
(52) U.S. Cl. ........................ 524/270; 524/271; 525/93
(58) Field of Search ................................ 524/270, 271; 525/93

(56) References Cited

U.S. PATENT DOCUMENTS

| | | |
|---|---|---|
| 4,017,436 A | 4/1977 | Tabana et al. |
| 4,704,110 A | 11/1987 | Raykovitz et al. |
| 5,216,074 A | 6/1993 | Imai et al. ..................... 525/66 |
| 5,286,781 A | 2/1994 | Gotoh et al. ................. 524/505 |
| 5,776,998 A | 7/1998 | Southwick et al. .......... 522/111 |
| 5,837,749 A | 11/1998 | Erickson et al. .............. 522/31 |

FOREIGN PATENT DOCUMENTS

| | | |
|---|---|---|
| JP | 62048787 A | 3/1987 |
| JP | 05214209 A | 8/1993 |
| JP | 96003081 B2 | 1/1996 |
| JP | 08081616 A | 3/1996 |
| JP | 2836186 B2 | 12/1998 |

OTHER PUBLICATIONS

International Search Report of Feb. 6, 2001.

*Primary Examiner*—Edward J. Cain

(57) ABSTRACT

This invention relates to curable strippable adhesive and coating films, and also to improved high performance pressure sensitive adhesives. The adhesive comprises:

(a) from 10 to 90 percent by weight of a crosslinkable epoxidized diene polymer, (b) from 0 to 70 percent by weight of a diene mono-ol polymer, with the condition that the mono-ol polymer not exceed three times the weight of the epoxidized polymer, (c) from 5 to 40 weight percent of a block copolymer of a vinyl aromatic hydrocarbon and a diene having, on average, more than one vinyl aromatic hydrocarbon block per molecule, and wherein the block copolymer can be functionalized by grafting onto it from 0.1 to 5% by weight of a carboxylic acid or anhydride, preferably maleic anhydride, (d) from 0 to 65% percent by weight of a tackifying resin, and (e) from 0.01 to 3 percent by weight of a photoinitiator.

10 Claims, No Drawings

FORMULATION FOR STRIPPABLE ADHESIVE AND COATING FILMS AND HIGH PERFORMANCE ADHESIVE

This application claims the benefit of U.S. Provisional Application No. 60/160,032, filed Oct. 18, 1999, the entire disclosure of which is hereby incorporated by reference

FIELD OF THE INVENTION

This invention relates to improved high performance pressure sensitive adhesives and protective and decorative strippable adhesive and coating films. More particularly, the invention relates to a novel formulation for forming improved adhesives and such strippable films by curing the formulation by irradiating it with UV light.

BACKGROUND OF THE INVENTION

Protective and decorative strippable adhesive and coating films are well known and are highly useful for application to home and store windows and the windows and panels of automobiles to serve as either a protective or decorative covering or both. This type of film is applied in sheet form, cured, and printed, and it is preferred that it is capable of being wound upon itself without the necessity of a release coating or a release liner.

U.S. Pat. No. 5,286,781 describes a pressure sensitive adhesive composition and tape or sheet made therefrom which is comprised of a block copolymer of a vinyl aromatic hydrocarbon and a conjugated diene and a particular polyolefin. Also described therein are previous protective films made with such block copolymers and several other similar polymers.

Formulations based on the above block copolymers are used commercially and have the advantage that they exhibit elastic properties at room temperature. However, they are limited in their susceptibility to high service temperatures, i.e., above about 70° C. At such temperatures, the films weaken cohesively.

Adhesive films based on UV cured epoxidized polydiene polymers are described in U.S. Pat. Nos. 5,776,998 and 5,837,749. While adhesive and coating films made from these materials are highly useful for high performance pressure sensitive adhesives, these formulations do not work very well for strippable coatings. Such films generally have poor tensile properties. They tear or break upon only a small induced elongation. This limits the quality of the strippable coatings and adhesive films because they break too easily and this prevents easy removability. The present invention eliminates this problem.

Furthermore, using this invention, improved high performance pressure sensitive adhesives can be obtained that are more cost effective and convenient to handle for those who have a need for handling a solid adhesive at room temperature such as any typical hot melt adhesive formulator or user. This invention can be handled like a typical hot melt adhesive and later UV cured to get the desired properties. Also, the adhesive can be precoated on a paper or film stock roll and then UV cured in latter operation that is followed by immediate bonding of the substrates. Immediate bonding after cationic UV cure gives higher bond strengths.

SUMMARY OF THE INVENTION

This invention relates to curable strippable adhesive and coating films, and also to improved high performance pressure sensitive adhesives. The adhesive comprises:

(a) from 10 to 90 percent by weight of a crosslinkable epoxidized diene polymer, (b) from 0 to 70 percent by weight of a diene mono-ol polymer, with the condition that the mono-ol polymer not exceed three times the weight of the epoxidized polymer, (c) from 5 to 40 weight percent of a block copolymer of a vinyl aromatic hydrocarbon and a diene having, on average, more than one vinyl aromatic hydrocarbon block per molecule, wherein the amount of vinyl aromatic hydrocarbon in the block copolymer is less than 30% by weight, and wherein the block copolymer can be functionalized by grafting onto it from 0.1 to 5% by weight of a carboxylic acid or anhydride, preferably maleic anhydride, (d) from 0 to 65% percent by weight of a tackifying resin, and (e) from 0.01 to 3 percent by weight of a photoinitiator.

Formulations can also be made with block copolymers containing 30 to 50 percent by weight of a vinyl aromatic hydrocarbon. In this case, a tackifying resin containing from _2_ to _20, preferably 3 to 10,_ percent by weight aromaticity must be used in an amount of 5 to 65, preferably 20 to 40, percent by weight. The use of this type of tackifying resin allows compatible formulations to be made with the block copolymers containing 30 to 50 percent by weight vinyl aromatic hydrocarbon and the crosslinkable epoxidized diene polymer.

The preferred epoxidized diene polymer of the present invention is an epoxidized monohydroxylated block copolymer of at least two conjugated dienes, preferably isoprene and butadiene, wherein the isoprene block substantially contains the epoxidation, the butadiene block is hydrogenated, and the hydroxyl group is attached at the end of the butadiene block. It is preferred that the polydiene mono-ol polymer have a number average or hydroxyl equivalent molecular weight of 2000 to 30,000 and these polymers are preferably hydrogenated polybutadiene with a terminal OH group. The preferred mono-ol polymer, block copolymer, and tackifying resins are hydrogenated.

DETAILED DESCRIPTION OF THE INVENTION

Polymers of this invention containing ethylenic unsaturation can be prepared by polymerizing one or more olefins, particularly diolefins, by themselves or with one or more alkenyl aromatic hydrocarbon monomers. The polymers may, of course, be random, tapered, block or a combination of these, as well as linear, star or radial. In general, when solution anionic techniques are used, polymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, naphthalides, biphenyls or anthracenyl derivatives.

The vinyl aromatic hydrocarbon/diene block copolymers and the epoxidized polydienes and polydiene monools are synthesized by anionic polymerization of vinyl aromatic and/or conjugated diene hydrocarbons with these lithium initiators. This process is well known as described in U.S. Pat. No. 4,039,593 and U.S. Pat. No. Re. 27,145 which descriptions are incorporated herein by reference. Polymerization commences with a monolithium initiator which builds a living polymer backbone at each lithium site.

Typically, such polymerizations are capped by termination with ethylene oxide to provide a terminal hydroxyl group.

Conjugated diolefins which may be polymerized anionically include those conjugated diolefins containing from about 4 to about 24 carbon atoms such as 1,3-butadiene, isoprene, piperylene, methylpentadiene, 2-phenyl-1,3-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl naphthalene, alkyl-substituted vinyl naphthalenes and the like.

Block copolymers of vinyl aromatic hydrocarbons and conjugated dienes such as used herein are very well known and are described in the aforementioned U.S. Pat. No. 4,039,593 and U.S. Pat. No. Reissue 27,145 among many others. Typically, these polymers contain two vinyl aromatic hydrocarbon blocks, one at each end, and an internal conjugated diene block. For example, the polymer may be styrene-isoprene-styrene or styrene-butadiene-styrene.

The aforementioned commonly used triblock copolymers are not very compatible with the epoxidized diene polymers used in this invention. One way of increasing the compatibility is for the hydrogenated block copolymer to have at least some of the polymer molecules with a hydrogenated diene block on at least one end of the molecule. Another way of increasing the compatibility is to keep the amount of vinyl aromatic hydrocarbon in the block copolymer less than 30% by weight. The compatibility of block copolymers having a vinyl aromatic hydrocarbon content of from 30 to 50 percent by weight can be increased by utilizing from 5 to 65, preferably 20 to 40, percent by weight of a tackifying resin which contains from __2__to __20, preferably 3 to 10, __percent by weight of aromaticity. The concentration of the resin can be at the low end if a higher aromaticity content resin is used. Other resins with no aromaticity can be used in combination with this resin and a mineral oil can be added if it is desired to lower the $T_g$ of the composition.

One preferred way to achieve such a hydrogenated block copolymer is to use a block copolymer which has a coupling efficiency of no more than 80 percent. One method of making such triblock copolymers is to first make two diblock copolymers and then couple them together end to end. The coupling efficiency is a measure of how successful the coupling reaction is. In the present case, it would be desirable to have at least 20 percent of the polymer molecules remaining as a diblock.

In another preferred embodiment of the present invention, the block copolymer used is a four block copolymer which has alternating vinyl aromatic hydrocarbon blocks and conjugated diene blocks. This provides the required external polydiene block. The preferred block copolymer for use herein is a linear block copolymer of the formula:

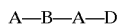

wherein A is a vinyl aromatic hydrocarbon polymer block having a weight average molecular weight of from 4000 to 35,000, B is a hydrogenated polydiene polymer block having a weight average molecular weight of from 20,000 to 200,000, D is a hydrogenated or unhydrogenated polydiene polymer block having a weight average molecular weight of from 3000 to 50,000, and the copolymer has a vinyl aromatic hydrocarbon content of from 9 to 35 percent by weight.

The preferred four block polymers of the present invention may have a weight average molecular weight of from 30,000 to 150,000. The midblock (B block) of the four block must be hydrogenated to achieve the desired thermal, ultraviolet, and viscosity stability. Preferably, it is a hydrogenated polybutadiene (EB) or polyisoprene (EP) block. The other polydiene block (D block) can be unhydrogenated or hydrogenated.

The block copolymers used in this invention may be functionalized by grafting thereon a carboxylic acid or anhydride. As described in U.S. Pat. No. 4,578,429, which is herein incorporated by reference, in general any materials having the ability to react with the base polymer in free radical initiated reactions are operable monomers for the purposes of this invention. These monomers must be capable of reacting with the base polymer in solution or in the melt by a free radical mechanism. The monomers may be polymerizable or non-polymerizable but preferred monomers are non-polymerizable or slowly polymerizable.

The monomers must be ethylenically unsaturated in order to take part in free radical reactions. The class of preferred monomers which will form graft polymers within the scope of this invention have one or more functional groups or their derivatives such as carboxylic acid groups and their salts, anhydrides, esters, imide groups, amide groups, acid chlorides, and the like in addition to at least one point of unsaturation. These functionalities can be subsequently reacted with other modifying materials to produce new functional groups on the polymer either simultaneously with the grafting or in a post modification reaction.

The preferred modifying monomers are unsaturated mono- and polycarboxylic-containing acids ($C_3$–$C_{10}$) with preferably at least one olefinic unsaturation, and anhydrides, salts, esters, ethers, amides, nitrites, thiols, thioacids, glycidyl, cyano, hydroxy, glycol, and other substituted derivatives from such acids. Specific examples of useful materials include maleic acid, fumaric acid, acrylic acid, glycidyl acrylate, hydroxyalkylmethacrylates, methacrylic acid, maleic anhydride, acrylonitrile and others described in the aforementioned U.S. Pat. No. 4,578,429. The preferred monomers are maleic anhydride, maleic acid, fumaric acid and their derivatives. It is well known in the art that these monomers do not polymerize easily.

The method of preparation of these graft block copolymers is described in detail in the aforementioned U.S. Pat. No. 4,578,429 which is herein incorporated by reference. The grafting reaction is initiated by a free radical initiator, the concentration of which preferably ranges from 0.01 to 1.0 weight percent, at temperatures of 75° C. to 350° C. The reaction typically takes place in a screw type extruder to mix and melt the reactants and to heat the reactant mixture to the desired reaction temperature. The polymers used herein may contain from 0.1 up to 5% by weight of the grafted monomer.

The most preferred monohydroxylated polydiene polymer of the present invention has the structural formula

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a number average molecular weight of from 100 to 6000 g/mol, preferably 500 to 4,000 g/mol, and most preferably 1000 to 3000 g/mol, and the B blocks have a number average molecular weight of from 1000 to 15,000 g/mol, preferably 2000 to 10,000 g/mol, and most preferably 3000 to 6000 g/mol. S is a vinyl aromatic hydrocarbon block which may have a number average molecular weight of from 100 to 10,000. x and y are 0 or 1. Either x or y must be 1, but only one at a time can be 1. z is 0 or 1. Either the A or the B block may be capped with a miniblock of polymer, 50 to 1000 number average molecular weight, of a different composition, to compensate for any initiation, tapering due to unfavorable copolymerization rates, or capping difficulties. These monohydroxylated polydiene polymers may be epoxidized such that they contain from 0.1 to 7.0 milliequivalents (meq) of epoxide functionality (oxirane oxygen) per gram of polymer.

Diblocks falling within the above description are preferred. The overall number average molecular weight of such diblocks may range from 1500 to 15000 g/mol, preferably 3000 to 7000 g/mol. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I-B-OH I-B/S-OH I/S-B-OH I-I/B-OH or

B/I-B/S-OH B-B/S-OH I-EB-OH I-EB/S-OH or

I-S/EB-OH I/S-EB-OH HO-I-S/B HO-I-S/EB where EB is hydrogenated butadiene, -EB/S-OH means that the hydroxyl source is attached to a styrene repeating unit, and -S/EB-OH signifies that the hydroxyl source is attached to a hydrogenated butadiene repeating unit. This latter case, -S/EB-OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I-EB/S-EB-OH I-B/S-B-OH I-S-EB-OH I-S-B-OH or

I-I/S-I-OH I-S-I-OH B-S-B-OH B-B/S-B-OH or

I-B/S-I-OH I-EB/S-I-OH or

I-B-S-OH I-EB-S-OH HO-I-EB-S

The latter group of polymers specified in the last line above wherein the styrene block is external are represented by the formula $$(HO)_x\text{—}A\text{—}B\text{—}S\text{—}(OH)_y \qquad (II)$$

where A, B, S, x, and y are as described above. These polymers and the other triblocks shown above are particularly advantageous for introducing blocks of epoxy functionality into the monohydroxylated polymers at multiple sites.

Epoxidation of the base polymer can be effected by reaction with organic peracids which can be preformed or formed in situ. Suitable preformed peracids include peracetic, performic, and perbenzoic acids. In situ formation may be accomplished by using hydrogen peroxide and a low molecular weight fatty acid such as formic acid. These and other methods are described in more detail in U.S. Pat. Nos. 5,229,464 and 5,247,026 which are herein incorporated by reference. Alternately, tungsten catalyzed phase transfer epoxidation can be carried out as described in J. Polymer Science, Pt A, 33 1881 (1995) by J. V. Crivello and B. Yang. The amount of epoxidation of these polydiene polymers ranges from about 0.1 to about 7 milliequivalents of oxirane oxygen per gram of polymer, Low levels are desirable to avoid overcure. Above 7 meq/g, the rigidity, crosslink density, cost, difficulty of manufacture, and polarity of the epoxidized are such that polymer does not provide any benefit. The preferred amount of epoxidation is about 0.5 to about 5 meq/g and the most preferred amount of epoxidation is about 1.0 to 3 meq/g. The most preferred amount provides the best balance of rate of UV cure against undesired overcure and better maintains compatibility with a variety of formulating ingredients commonly used with polydiene based adhesives.

The molecular weights of the linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the most abundant species shown on the chromatograph. For polydisperse polymers the number average and the weight average molecular weight should be calculated from the chromatograph and used. For materials to be used in the columns of the GPC, styrene-divinylbenzene gels or silica gels are commonly used and give excellent molecular weight results. Tetrahydrofuran is an excellent non-aqueous solvent for polymers of the type described herein. A refractive index detector may be used. For anionic polymers, it is also often convenient to determine the number average molecular weight by end group analysis using NMR.

If desired, these block copolymers can be partially hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference. Partially unsaturated hydroxylated polymers are useful for further functionalization to make the epoxidized polymers of this invention. The partial unsaturation preferably is such that 0.1 to 7 meq of aliphatic double bonds suitable for epoxidation remain on the polymer. If epoxidation is carried out before hydrogenation, then it is preferred that all remaining aliphatic double bonds be hydrogenated.

It is highly advantageous to include in the composition a low molecular weight polydiene monool in order to improve the tack of the adhesive. These polymers preferably have a functionality of 0.6 to 1.4, more preferably 0.8 to 1.2, and most preferably from 0.9 to 1.0. Such monools have a number average molecular weight of 2000 to 30,000 g/mol and are preferably hydrogenated polydiene polymers with a terminal OH, such as monohydroxylated hydrogenated polybutadiene or polyisoprene. Preferred monools include those with a number average molecular weight range of 2000 to 10,000 g/mol.

Strippable coatings are films that are not attached support film. These require the use of very little or no mono-ol polymer and tackifying resin, so that the tack on the exposed surface of the film is minimal. These films can be preformed or sprayed, dipped, or otherwise applied to the object requiring protection. Such strippable coatings can be used for chemical milling. The percent by weight mono-ol should not be more than 10% by weight and the tackifying resin should not be more 20% by weight of the entire formulation.

Excellent, cost effective high performance tape and label pressure sensitive adhesives (PSA), such as for permanent labels and automotive adhesives, require the epoxidized polymer to be between 15 and at most 25% by weight of the entire formulation. The epoxidized polymer is the most expensive polymer to produce and must be minimized to obtain the most cost effective adhesive. However, at levels below 15% by weight, high temperature resistance for high performance products becomes borderline for many applications.

A high level of tackifier resin is also important for cost effectiveness, as well as to impart and balance PSA physical properties. Tackifier resin is normally the least expensive of the required components of the present inventive adhesives. To satisfy these concerns, the tackifier level must to be between 40% and 65% by weight of the entire formulation.

The level of the block copolymer should be between 10% and 20% by weight. The block copolymer is generally less expensive than the mono-ol polymer and especially the epoxidized molecule. Therefore, the more the block copolymer acts as a replacement for the other two polymers, the lower the cost of the formulation. However, for the adhesive to have good tack, there must be a significant amount of mono-ol polymer in the formulation. Using more than 20% by weight of the block copolymer can prevent the incorporation of sufficient mono-ol polymer. The amount of mono-ol in the formulation must be between 8 and 30% by weight to provide the necessary high tack.

Further, at 10 to 20% by weight of the formulation, the block copolymer provides sufficient elasticity at room to slightly elevated temperatures for the adhesive to remain a solid. Thus, it can hold on vertical surfaces and it can be coated and rewound even without being UV cured. Significantly, it can be packaged and handled as a solid before introduction to the coating equipment. The high performance adhesive has the advantage that it can be handled by production personnel in a manner with which they are familiar, i.e., no special steps or equipment are required, as it will behave much like a typical hot melt adhesive. Another advantage of only using 10 to 20% of the block copolymer is that the application temperature can be as low as 100 and 150° C. instead of the typical 170 to 200° C. range for known thermoplastic block copolymer adhesive formulations. This is advantageous when the adhesive is applied on heat sensitive substrates.

Adhesive films that are designed to incorporate fiber or fiber mats or foams to deliver extra properties generally require less cure in the adhesive. Therefore, somewhat less epoxidized polymer should be incorporated into such a high performance adhesive composite. Here the epoxidized polymer should be about 10 to 20% by weight of the high performance adhesive, excluding the weight the fiber, fiber mat, or foam.

The formulations of this invention may be cured by cationic means using acid catalysts but are preferably cured by means of ultraviolet or electron beam radiation. Radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used. A complete description of how this irradiation may be accomplished is found in commonly assigned U.S. Pat. No. 5,229,464 which is herein incorporated by reference.

When using non-ionizing radiation it is necessary to employ a photoinitiator to initiate the crosslinking reaction. In this invention, the photoinitiator is one which is very compatible with the composition, preferably soluble in it. It is used in an amount of from 0.01 to 10% by weight of the total composition, preferably 0.1 to 10%, more preferably 0.1 to 1.0%, most preferably 0.1 to 0.3%. Useful photoinitiators include diaryliodonium, alkoxy-substituted diaryliodonium, triarylsulfonium, dialkylphenacylsulfonium, dialkyl-4-hydroxylphenylsulfonium salts. The anions in these salts generally possess low nucleophilic character and include $SbF_6-$, $BF_4-$, $PF_6-$, $AsF_6-$, and $B(C6F5)4-$(tetrakis (pentafluoro-phenyl)borate). Specific examples include (4-octyloxyphenyl)-phenyl-iodonium hexafluoroantimonate, UVI-6990 (from Union Carbide), FX-512 (3M Company), and SILCOLEASE UV200CATA photoinitiators (Rhone-Poulenc Chemie). Bis (dodecylphenyl)-iodonium hexafluoroantimonate, UV 9310 (GE), and triaryl sulfonium hexafluoroantimonate, UVI-6974 (Union Carbide), are especially effective. The onium salts can be used alone or in conjunction with a photosensitizer to respond to long wavelength UV and visible light. Examples of photosensitizers include thioxanthone, anthracene, perylene, phenothiazione, 1,2-benzathracene coronene, pyrene and tetracene. Generally, the photoinitiator and photosensitizer are chosen to be compatible with the polymer/formulation being crosslinked and the light source available. When the photoinitiator is insoluble in the neat polymer or a 100% solids formulation, it should be adequately dispersed into the polymer/formulation.

Other useful photoinitiators include those described in U.S. Pat. No. 5,079,378 which is herein incorporated by reference. These photoinitiators may be described as diaryl, preferably diaryliodonium, salts characterized by the general formula:

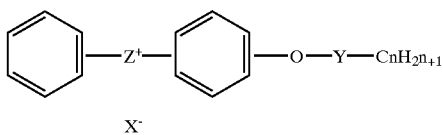

where Y is

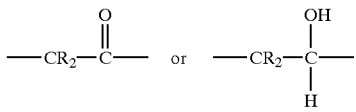

where R is hydrogen, aryl, alkyl, or an alkylhalide; n is an integer of at least 1, Z is I, Cl, or Br, preferably I, and X is a complex metal halide anion or a complex halide anion of a strong protonic acid. Included are complex metal halide anions such as $BF_4^-$, $PF_6^-$, $AsF_6^-$, $SbF_6^-$, as well as anions of strong protonic acids such as $ClO_4^-$, $CF_3SO_3^-$, $FSO_3^-$, $CH_3SO_3^-$, and $C_4F_9SO_3^-$. Especially useful is another similar compound, CD-1012 supplied by the Sartomer Company. This is a diaryliodonium hexafluoroantimonate and has the formula:

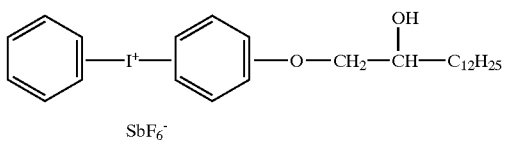

It is common practice to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of a mixture containing approximately 60% piperylene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 20° C. and 150° C. Hydrogenated hydrocarbon resins are especially useful. These hydrogenated resins include such resins as Regalrez® 1018, 1085, 1094, 1126, and 1139, and Regalite® R91, R101, R125, and T140 supplied by Hercules, Arkon® P70, P90, P115, P125 supplied by Arakawa, and similar other resins such as the Escorez® 5300 resin series supplied by Exxon. Examples of high aromaticity content resins are Regalite® V1100 (16.6 wt %) and Regalite® V3100 (5 wt %) hydrogenated hydrocarbon resins.

Aromatic resins may also be employed as tackifying agents, provided that they are compatible with the particular polymer used in the formulation. Useful resins include coumarone-indene resins, polystyrene resins, vinyl toluene-alpha methylstyrene copolymers and polyindene resins.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

EXAMPLES

Polymer No. 1 is a hydrogenated styrene-isoprene-styrene-isoprene (SEPSEP) block copolymer having block molecular weights of 6700-50,00-6700-8000, and a polystyrene content of 20.5 percent by weight. Polymer 2 is a 71 percent coupled hydrogenated styrene-butadiene-styrene (SEBS) block copolymer containing 13.3 percent polystyrene and having a polystyrene block molecular weight of 5300. Polymer 3 is an epoxidized linear monohydroxy diene polymer with a number average molecular weight of 5500. The polymer is a diblock polymer wherein the first block consists of hydrogenated epoxidized polyisoprene and the second block is hydrogenated polybutadiene. The second block has a terminal primary hydroxyl group. The polymer has 1.4 meq of epoxide functionality per gram and 0.17 meq of hydroxyl groups per gram. Polymer 4 is a linear monohydroxy diene polymer with a number average molecular weight of 3950 and 0.25 meq per gram of hydroxyl functionality. The monool has a terminal primary hydroxyl group.

The SAFT (shear adhesion failure temperature) was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7). Long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack.

Example 1

In the first example (see Table 1) six adhesive formulations were prepared and tested. The formulations were prepared using a Sigma blade mixer. Polymer 2 and the tackifying resin (Regalite R-91, Hercules) were melt mixed together at about 163C, then the mono-ol polymer, Polymer 4, was added and mixed in. The epoxidized polymer, Polymer 3 and the photointiator (Cyracure UVI-6974, Union Carbide) were added and mixed at about 143C until uniform. The photoinitiator had been previously dispersed in a portion of Polymer 4 using sonication.

Adhesive films were prepared by coating the adhesives onto continuous Akrosil F1U release liner with a gravity fed slot lab Chemsultants coater. The uncured adhesive/liner was cut into approximately one foot strips. Each strip was reheated for 45 seconds in a 80° C. oven and then immediately cured while still hot with a 600 watt/in Fusion "H" UV bulb. Immediately after cure, the adhesive strip was hand laminated to the corona treated side of 2 mil Mylar film. The films were held for 5 days at constant temperature, 23° C., and relative humidity, 50%, for 5 days before testing was begun.

TABLE 1

| Formulation | 1 | 2 | 3 | 3 | 4 | 5 | 6 |
|---|---|---|---|---|---|---|---|
| Polymer 2 | 12.49 | 12.69 | 24.98 | | 37.05 | 37.27 | 24.98 |
| REGALITE R-91 | 49.84 | 49.03 | 49.83 | | 50.39 | 50.11 | 49.83 |
| Polymer 4 | 18.73 | 26.25 | 14.99 | | 6.18 | 8.70 | 25.19 |
| Polymer 3 | 18.73 | 11.42 | 9.99 | | 6.18 | 3.73 | 0.00 |
| UVI-6974 | 0.20 | 0.20 | 0.20 | | 0.20 | 0.20 | 0.00 |
| SUM | 100.0 | 100.0 | 100.0 | | 100.0 | 100.0 | 100.0 |
| Application temperature, C. | 82 | 82 | 135 | | 166 | 157 | 135 |
| UV dose, mJ/cm2 | 200 | 200 | 200 | 0 | 200 | 200 | 0 |
| 180 Peel from stainless steel (SS), pli | 3.6 | 4.1 | 3.5 | 1.3 cohesive failure (coh) | 1.5 | 1.6 | 2.4 |
| Loop tack on SS, pli | 4.6 | 5.6 | 5.1 | 2.7 | 1.6 | 2.4 | 2.8 |
| Probe tack to SS, g | 390 | 540 | 360 | 740 | 40 | 80 | 430 |
| Holding power to SS, 1 in2, 2 Kg, hour | >168 | 29.2 | >168 | 0.2 coh | 0.1 | 0.0 | 0.4 |
| 95 C holding power to SS, 1 in2, 500 g, hour | 3.1 coh | 0.9 coh | 1.0 coh | 0.0 coh | 0.0 coh | 0.0 coh | 0.0 coh |
| SAFT on SS, 1 in2, 500 g, C | 195 coh | 114 coh | 114 coh | <88 | <88 | <88 | <88 |

Formulation 3, where no UV dose was used, formulation 4, having only about 6% epoxidized polymer, formulation 5, having only abut 4% epoxidized polymer, and formulation 6, having no epoxidized polymer and no photoinitiator, are counter examples of the invention. They show no ability to hold a 500 gram weight at 95° C. and have SAFT values less than 90° C. Further they have virtually no room temperature holding power. Formulations 1, 2, and 3, all UV cured, are examples of the invention. These formulations are very elastic at room temperature, have good peel and tack values for a PSA, and also show high temperature resistance. All of the cured films were completely uniform in appearance. Also, all of the precured formulations looked completely uniform with no sign of any bleed out after 5 months storage at room temperature. Formulations like these have the added advantage that they can be stored in release lined boxes instead of cans because they are non-flowing at room temperature.

Example 2

The formulations in example 2 were prepared and tested in a similar fashion to example 1. The UVI-6964 photoinitiator was added as a 5 dispersion in Polymer 3 instead of in Polymer 4. The formulations and results are given in Table 2. All five of the formulations are examples of the invention when UV cured. Since they all contain more than 10% of Polymer 2, all are quite elastic at room temperature. All cured formulations maintain a SAFT of at least 90° C. Formulation 5, having only about 10% of the epoxidized polymer, has the weakest high temperature properties of the set, including a SAFT value of only 90° C., and failed cohesively. Formulation 5 shows that the minimum amount of epoxidized polymer should be about 10% if elevated temperature properties are to be achieved. All of the formulations have relatively low 180° peel compared to the examples of the invention in example 1. This is due to the low mono-ol (Polymer 4) levels. The mono-ol polymer levels relative to the epoxidized polymer (Polymer 3) are less than 1 to 1. This would allow them to be removed relatively easily from a substrate. UV cured formulations 3, 2, and 1 have increasing SAFT values, reflecting the increased amounts of epoxidized polymer (Polymer 3) in the formulations.

TABLE 2

| Formulation | 1 | 2 | 3 | 3 | 4 | 5 |
|---|---|---|---|---|---|---|
| Polymer 2 | 16.85 | 17.33 | 24.44 | | 31.56 | 32.06 |
| Regalite R-91 | 51.67 | 50.30 | 50.93 | | 51.24 | 50.47 |
| Polymer 4 | 0.00 | 12.87 | 4.89 | | 0.00 | 6.91 |
| Polymer 3 | 31.29 | 19.31 | 19.55 | | 16.99 | 10.36 |
| UVI-6974 | 0.20 | 0.20 | 0.20 | | 0.20 | 0.20 |
| SUM | 100.0 | 100.0 | 100.00 | | 100.0 | 100.0 |
| Application temperature, ° C. | 127 | 124 | 152 | | 177 | 154 |
| UV dose, mJ/cm2 | 200 | 200 | 200 | 0 | 200 | 200 |
| 180° peel from PP, pli | 2.3 | 2.9 | 1.5 | 1.9 | 2 | 1.7 |
| Loop tack, pli | 1 | 1.8 | 2.3 | 2.3 coh | 1.7 | 1.9 |
| HP to SS, 1 in², 2 Kg, Hours | >100 | >100 | >100 | .1 coh | >100 | 2.3 |

TABLE 2-continued

| Formulation | 1 | 2 | 3 | 3 | 4 | 5 |
|---|---|---|---|---|---|---|
| 95° C. HP to SS, 1 in², 500 g, hours | >100 | >100 | >100 | .002 coh | .1 coh | .05 coh |
| 95° C. HP to SS, 1 in², 1 Kg, hours | >100 | >100 | >100 | .002 coh | 0.03 coh | 0.01 coh |
| SAFT, 1 in², 500 g, ° C. | >204 | 183 | 153 | low coh | 98 coh | 90 coh |

Example 3–5

The formulation of example 3–5, shown in Tables 3–5 were prepared on a Banbury mixer.

TABLE 3

| Adhesive | 24177-34-G | |
|---|---|---|
| Polymer 1 | 15.68 | |
| Regalite R-125 | 40.00 | Mixed until uniform at 180° C. |
| Polymer 4 | 24.32 | |
| Polymer 3 | 19.80 | Added stepwise and mixed at 140° C. |
| UVI-6974 (added as a 5% dispersion in Polymer 3) | 0.20 | |
| Sum = | 100.00 | |
| Appearance of bulk adhesive after about 2 months room temperature aging. | Some gooey liquid on surface of adhesive solid | |
| Handling properties prior to cure | Similar to conventional hotmelts, but with lower application temperature | |

| PSA Properties | No Cure | After UV Cure |
|---|---|---|
| Adhesive film thickness, mil | 6.0 | 5.3 |
| 180° Peel from PP, 12 in/min, pli | 2.8 | 4.4 |
| Probe tack, Kg | | 0.316 |
| HP to SS, 1 in², 2 Kg, hr | 0.14 coh | >188 |
| 95° C. HP to SS, 1 in², 500 g, hr | | >123 |
| SAFT, SS, 1 in², 500 g, ° C. | 30 coh | >160 |

TABLE 4

| | 1 | 2 | 3A | 3B | 4 | 5 |
|---|---|---|---|---|---|---|
| Binder composition | | | | | | |
| Polymer 1 | 30 | 30 | 40 | | 50 | 50 |
| Polymer 3 | 35 | 45 | 40 | | 35 | 45 |
| Polymer 4 | 35 | 25 | 20 | | 15 | 5 |
| Polymer 1 | 14.97 | 14.97 | 19.96 | | 24.95 | 24.95 |
| Regalite R-91 | 49.90 | 49.90 | 49.90 | | 49.90 | 49.90 |
| Polymer 4 | 17.47 | 12.48 | 9.98 | | 7.49 | 2.50 |
| Polymer 3 | 13.67 | 18.66 | 16.16 | | 13.67 | 18.66 |
| 5% UVI-6974 in Polymer 3 | 4.00 | 4.00 | 4.00 | | 4.00 | 4.00 |
| sum | 100.01 | 100.01 | 100.00 | | 100.01 | 100.01 |
| Appearance of bulk adhesive after several weeks aging at room temperature | Some gooey liquid on surface of solid adhesive | Some gooey liquid on surface of solid adhesive | Trace of goo on surface | | Clean uniform solid | Clean uniform solid |
| Application temperature, ° C. | 132 | 132 | 160 | 154 | 174 | 174 |
| Adhesive thickness, micron | 1.5 | 1.5 | 1.5 | 5 | 1.5 | 1.5 |
| Gel, % | 65.3 | 86.4 | 85.4 | 94.0 | 93.6 | 100.0 |
| Uniformity of cured free adhesive several weeks after cure | Uniform, very stretchable, elastic | Uniform, very stretchable, elastic | Uniform, very stretchable, elastic | Uniform, very stretchable, elastic | Uniform, very stretchable, elastic | Uniform, very stretchable, elastic |
| 180° peel from SS (30 min dwell), pli | 3.0 | 2.7 | 2.8 | 3.2 | 2.6 | 1.9 |
| 180° peel from PP (30 min dwell), pli | 3.5 | 3.0 | 2.7 | 3.2 | 2.0 | 1.7 |
| 180° peel from HDPE (30 min dwell), pli | 1.5 | 1.0 | 0.90 | 1.0 | 0.8 | 0.5 |
| Loop tack, pli | 4.3 | 3.2 | 2.3 | 4.1 | 2.3 | 1 |
| Polyken probe tack, g | 410 | 195 | 90 | 610 | 80 | 45 |
| Holding Power to SS, 0.5 in², 2 Kg, Hours | 4.6 | 14 | 2 | 1.8 | 0.6 | 2.7 |

TABLE 4-continued

|  | 1 | 2 | 3A | 3B | 4 | 5 |
|---|---|---|---|---|---|---|
| Holding Power to SS, 1 in$^2$, 2 Kg, Hours | >168 | >168 | >168 | >168 | >168 | >168 |
| 95° C. holding power to SS, 1 in$^2$, 1 Kg, hours | 2 coh | 7.4 coh | >100 | 7.5 | 1 coh | 1.2 coh |
| 95° C. holding power to SS, 1 in$^2$, 500 g, hours | >100 | >100 | >100 | >100 | >100 | >100 |
| SAFT, 1 in$^2$, 500 g ° C. | 161 coh | 147 coh | 164 coh | 169 coh | 167 coh | 181 coh |

TABLE 5

|  | 1 | 2 | 3A | 3B | 4 | 5 |
|---|---|---|---|---|---|---|
| Binder composition |  |  |  |  |  |  |
| Polymer 1 | 30 | 30 | 40 |  | 50 | 50 |
| Polymer 3 | 35 | 45 | 40 |  | 35 | 45 |
| Polymer 4 | 35 | 25 | 20 |  | 15 | 5 |
| Polymer 1 | 17.96 | 17.96 | 23.95 |  | 29.94 | 29.94 |
| Regalite 125 | 39.92 | 39.92 | 39.92 |  | 39.92 | 39.92 |
| Polymer 4 | 20.96 | 14.97 | 11.98 |  | 8.98 | 2.99 |
| Polymer 3 | 17.16 | 23.15 | 20.15 |  | 17.16 | 23.15 |
| 5% UVI-6974 in Polymer 3 | 4.00 | 4.00 | 4.00 |  | 4.00 | 4.00 |
| sum | 100.00 | 100.00 | 100.00 |  | 100.00 | 100.00 |
| Appearance of bulk adhesive after several weeks aging at room temperature | Some gooey liquid on surface of solid adhesive | Some gooey liquid on surface of solid adhesive | Trace of goo on surface |  | Clean uniform solid | Clean uniform solid |
| Application temperature, ° C. | 132 | 132 | 149 | 146 | 160 | 168 |
| Adhesive thickness, micron | 1.5 | 1.5 | 1.5 | 5 | 1.5 | 1.5 |
| Gel, % | 76.7 | 89.4 | 84.8 | 90.5 | 87.0 | 100.0 |
| Uniformity of cured free adhesive several weeks after cure | Uniform, very stretchable, elastic | Uniform, very stretchable, elastic | Uniform, very stretchable, elastic | Uniform, very stretchable, elastic | Uniform, very stretchable, elastic | Uniform, very stretchable, elastic |
| 180° peel from SS (30 min dwell), pli | 3.5 | 2.9 | 2.5 | 3.5 | 3.0 | 3.0 |
| 180° peel from PP (30 min dwell), pli | 3.0 | 1.7 | 1.9 | 3.2 | 2.9 | 2.4 |
| 180° peel from HDPE (30 min dwell), pli | 0.8 | 0.5 | 0.03 | 0.6 | 0.5 | 0.2 |
| Loop tack, pli | 1.6 | 0.5 | 1.9 | 1.8 | 1.7 | 0.5 |
| Polyken probe tack, g | 130 | 25 | 15 | 90 | 20 | 5 |
| Holding Power to SS, 0.5 in$^2$, 2 Kg, Hours | 66 | >168 | 30 | 78 | 5.6 | 27 |
| Holding Power to SS, 1 in$^2$, 2 Kg, Hours | >168 | >168 | >168 | >168 | >168 | >168 |
| 95° C. holding power to SS, 1 in$^2$, 1 Kg, hours | >100 | >100 | >100 | >100 | >100 | >100 |
| 95° C. holding power to SS, 1 in$^2$, 500 g, hours | >100 | >100 | >100 | >100 | >100 | >100 |
| SAFT, 1 in$^2$, 500 g ° C. | 170 coh | 166 coh | 166 coh | 183 coh | 195 | 200 |

Example 6

The adhesives of example 6 were prepared in stages on a Branbury mixer. In step I, the maleated block copolymer, Polymer 5 (this is Polymer 2 which has been maleated such that there is 2 percent by weight maleation in the polymer), is melted and mixed with the tackifying resin Regalite P-125. In step II, the alcohol mono-ol polymer, Polymer 4, is reacted with the anhydride group on the block copolymer. In step III, a low molecular weight mono-epoxide diluent is reacted with the carboxylic acid on the block copolymer-mono-ol polymer adduct. In Part IV, the epoxidized polymer and the photoinitiator are mixed in and the epoxidized polymer may undergo some small grafting reaction to the adduct. In Adhesive M and N this final grafting reaction caused the adhesive to gel prematurely. From the gel content of adhesive O, it is apparent that at least a portion of the maleated block copolymer joins the final gel network of the UV cured adhesive. The same block copolymer, unmaleated, does not chemically co-react with the epoxidized polymer and the mono-ol polymer. Vikolox 14 is a $C_{14}$ alphaolefin monoepoxide.

TABLE 6a

| Maleated Block Copolymers |  |  |  |  |  |
|---|---|---|---|---|---|
|  | M | N | O | P | Q |
| Polymer 5 | 28.16 | 28.16 | 19.60 | 12.19 | 12.19 |
| Regalite P-125 | 50.00 | 50.00 | 50.00 | 50.00 | 50.00 |
| Polymer 4 | 21.84 | 21.84 | 30.40 | 37.81 | 37.81 |
| Vikolox 14 | 3.00 | 3.00 | 3.00 | 3.00 | 3.00 |
| Polymer 3 | 17.00 | 17.00 | 17.00 | 17.00 | 17.00 |
| PI (5% UVI-6974 in Polymer 3) | 5.00 | 5.00 | 5.00 | 5.00 | 5.00 |
| Sum | 125.00 | 125.00 | 125.00 | 125.00 | 125.00 |
| Molar ratio, MA/OH | 1 | 1 | 2 | 4 | 4 |

TABLE 6a-continued

Maleated Block Copolymers

| | M | N | O | P | Q |
|---|---|---|---|---|---|
| Part I mixing temperature, ° C. | 180 | 180 | 180 | 180 | 180 |
| Part II reaction temperature, ° C. | 140 | 180 | 160 | 140 | 180 |
| Parts III and IV reaction temperature, ° C. | 140 | 140 | 140 | 140 | 140 |

TABLE 6b

Maleated Block Copolymers

| Adhesive | M | N | O | P | Q |
|---|---|---|---|---|---|
| Molar ratio, MA/OH | 1 | 1 | 2 | 4 | 4 |
| MA/OH reaction temperature, ° C. | 140 | 180 | 160 | 140 | 180 |
| Appearance of bulk adhesive after about 1 month aging at room temperature | All the samples look uniform | | | | |
| Hand Application temperature, ° C. | gelled* | gelled* | 150 | 150 | 150 |
| PSA Properties after UV cure (Adhesive Temperature 80° C., 200 mJ/cm$^2$, 300 watt/in H bulb) | | | | | |
| Adhesive thickness, mil | | | 5.9 | 5.8 | 5.8 |
| Gel content, % of entire adhesive | | | 50.9 | 41.2 | 41.3 |
| Gel content, % of KLP | | | 122 | 86 | 87 |
| 180° peel from PP, pli | | | 5.2 | 5.4 | 5.2 |
| Loop tack, pli | | | 8.8 | 8.5 | 7.4 |
| Probe tack, Kg | | | 1.76 | 1.80 | 1.80 |
| HP to SS, 1 in$^2$, 2 Kg, Hours | | | >167 | >167 | >167 |
| 95° C. HP to SS, 1 in$^2$, 500 g, hours | | | >60 | >60 | >60 |
| SAFT, 1 in$^2$, 500 g, ° C. | | | >142 | 98 | 133 |

Example 7

Example 7 shows how to make very cost effective high performance PSA's (Table 7). These formulations are compared with two formulations that are not part of the invention. The counter examples represent the best formulations known based on the epoxidized liquid polymer, Polymer 3 and the mono-ol polymer, Polymer 4. They have some very good PSA properties, but they are both more costly and cannot be handled as like a conventional hot melt prior to coating and curing like adhesives 1 to 8 that are examples of the invention.

Adhesive 2 and adhesive 10 were made in excess of 10 gallon quantities and applied online with conventional hot melt coating equipment equipped with a single Fusion "H" 600 watt/in bulb. Adhesive 10 was applied at 80° C. on double sided release paper. With the UV light off, the adhesive coated paper immediately telescoped on the rewind roll. As soon as the light was turned on, the liquid material converted to solid form sufficiently for the roll to wind perfectly. With Adhesive 2, of this invention, it was coated at 121° C. and upon rewound perfectly with or without the UV light turned on. Adhesive 2 can be coated, stored, and cured later. Bonding within a few seconds or minutes of the cationic UV cure results in stronger bonds than using the same PSA adhesive after longer times have lapsed between cure and use. With Adhesives 9 or 10 preparing precoated stock for latter UV cure is not an option. With adhesive 2 it was possible to make both a UV exposed and an entirely un-UV exposed composite sandwich adhesive on line, consisting of 1.5 mil of adhesive 2, 0.5 Mylar film, and 1.5 mil of adhesive 2. The composite adhesive was easily self wound on double side release liner. Foral AX is a hydrogenated rosin acid tackifying resin.

TABLE 7

| Adhesive | 1 | 2 | 3 | 4 | 5 | 6 | 7 | 8 | 9 | 10 |
|---|---|---|---|---|---|---|---|---|---|---|
| Polymer 3 | 16.00 | 16.00 | 16.00 | 16.00 | 16.00 | 16.00 | 16.00 | 19.00 | 22.46 | 20.21 |
| Polymer 4 | 26.00 | 18.00 | 16.00 | 8.00 | 17.00 | 17.00 | 17.00 | 14.00 | 20.46 | 24.70 |
| Polymer 2 | 10.00 | 10.00 | 20.00 | 20.00 | 15.00 | 15.00 | 15.00 | 15.00 | 0 | 0 |
| Regalite V-1100 | 48.00 | 56.00 | 48.00 | 56.00 | 52.00 | 51.00 | 47.00 | 52.00 | 0 | 54.89 |
| Regalite R-91 | 0 | 0 | 0 | 0 | 0 | 0 | 0 | 0 | 54.88 | 0 |
| Foral AX | 0 | 0 | 0 | 0 | 0 | 1.00 | 5.00 | 0 | 0 | 0 |
| UVI-6974 (5% dispersion in polymer used) | 0.20 | 0.20 | 0.20 | 0.20 | 0.20 | 0.20 | 0.20 | 0.20 | 0.20 | 0.20 |
| Sum | 100.2 | 100.2 | 100.2 | 100.2 | 100.2 | 100.2 | 100.2 | 100.2 | 100.0 | 100.0 |
| Film thickness, mil | 5 | 5 | 5 | 5 | 5 | 5 | 5 | 5 | 5 | 5 |
| 180 Peel from SS, pli | 5.1 | 9.3 | 4.5 | 7.5 | 5.7 | 6.2 | 6.7 | 4.0 | 5.5 | 6.8 |
| Loop tack, pli | 6.1 | 6.4 | 5.2 | 2.95 | 8.3 | 8.0 | 8.0 | 2.9 | 5.8 | 10.0 |
| Probe tack, Kg | 1.63 | 1.71 | 1.18 | 1.42 | 2.15 | 1.88 | 2.233 | 0.57 | 0.555 | >2.0 |
| 23C Holding power, .5 in2, 2 Kg, hour | 1.8 | 14.1 | >27 | >168 | 18.6 | 12.2 | 11.5 | >168 | Not measured | 11.5 coh |
| 95C Holding power, 1 | Not | Not | Not | Not | Not | Not | Not | >100 | >168 | >48 |

TABLE 7-continued

| Adhesive | 1 | 2 | 3 | 4 | 5 | 6 | 7 | 8 | 9 | 10 |
|---|---|---|---|---|---|---|---|---|---|---|
| in2, 500 g, hour SAFT to SS, 1 in2, 500 g, C | measured 120 | measured 109 | measured >148 transfer | measured 105 transfer | measured 116 transfer | measured 111 | measured 121 coh | 169 | >204 | 200 |

Adhesives 1 to 8 were cured at about 8° C. using a 300 watt/in2 Fusion H bulb, Adhesives 9 and 10 were cured with a 600 watt/in2 Fusion H bulb. In all cases the dose was 200 mJ/cm2.

Example 8

Several formulations were made with Polymer 6 which is a hydrogenated block copolymer of styrene-butadiene-styrene containing 30 percent by weight styrene. It has a number average molecular weight of 50,000. These formulations also contained an oil, Drakol® 34 which is a _mineral_ oil, or Adtac® LV, which is a liquid aliphatic tackifying resin made from mixed monomers of petroleum origin. Tackifying resin Regalite® V-3100, which contains about 5 percent by weight aromaticity, was used.

The photoinitiator was dispersed in a portion of Polymer 4 as described in Example 1. All of Polymer 3 and the remainder of Polymer 4 and about half of the tackifying resin were mixed on a high speed Hockmeyer disperser to a temperature of about 130° C. Then Polymer 6 was added and the mixing was continued until the temperature increased to about 180° C. The mixture was mixed until all of Polymer 6 was dissolved and then mixed for another 15 minutes. The remaining tackifying resin was added to cool the mixture. At about 120 to 130° C., the photoinitiator dispersion was added and mixing was carried out for another 15 minutes at which time the batch mixture was complete.

Adhesive films were prepared as described in Example 1 with the following exceptions. They were direct coated onto 25 micron Mylar at 116° C. They were UV cured at 80° C. and 200 mJ/cm$_2$, and 600 watt/in Fusion H.

The results are shown in Tables 8 and 9. All formulations prove to be compatible. Formulations 8A and 8D were the ones used to make the films and the properties were excellent.

TABLE 8

| Formulation | 8A | 8B | 8C |
|---|---|---|---|
| Polymer 3 | 16.00 | 16.00 | 16.00 |
| Polymer 4 | 24.00 | 24.00 | 24.00 |
| Regalite V-3100 | 40.20 | 35.30 | 29.70 |
| Drakol 34 Oil | 9.80 | 14.70 | 20.30 |
| Polymer 6 | 10.00 | 10.00 | 10.00 |
| Cyracure UVI-6974 | 0.20 | 0.20 | 0.20 |
| Sum | 100.20 | 100.20 | 100.20 |

Screened at 25 and 50 micron film thickness.

| Properties of 8A | 25 micron | 50 micron |
|---|---|---|
| Rolling ball tack, in | 2.2 | 1.0 |
| Probe tack, g | 413 | 562 |
| 180° Peel, pli | 0.8 | 1.1 |
| 23° C. Holding power, 0.5 in$^2$, 500 g hour | >6 | >6 |
| 80° C. Holding power, 0.5 in$^2$, 500 g hour | >6 | >6 |

TABLE 9

| Formulation | 8D | 8E | 8F |
|---|---|---|---|
| Polymer 3 | 16.00 | 16.00 | 16.00 |
| Polymer 4 | 24.00 | 24.00 | 24.00 |
| Regalite V-3100 | 39.00 | 33.00 | 26.00 |
| Adtac LV | 11.00 | 17.00 | 24.00 |
| Polymer 6 | 10.00 | 10.00 | 10.00 |
| Cyracure UVI-6974 | 0.20 | 0.20 | 0.20 |
| Sum | 100.20 | 100.20 | 100.20 |

Screened at 25 and 50 micron film thickness.

| Properties of 8D | 25 micron | 40 micron |
|---|---|---|
| Rolling ball tack, in | 7.6 | 1.8 |
| Probe tack, g | 350 | 580 |
| 180° Peel, pli | 1.1 | 1.4 |
| 23° C. Holding power, 0.5 in$^2$, 500 g hour | 13.8 | >50 |
| 80° C. Holding power, 0.5 in$^2$, 500 g hour | 0.1 | 0.5 |

Example 9

This example was carried out according to the procedure of Example 8. Polymer 7 is a hydrogenated block copolymer of styrene and butadiene which contains 70 percent diblock polymer and has a polystyrene content of 31 percent by weight. The number average molecular weight is 73,000. Polymer 8 is a hydrogenated SEBS block copolymer having a number average molecular weight of 37.600 and a polystyrene content of 31% by weight. Polymer 9 is a hydrogenated SEBS block copolymer having a number average molecular weight of 35,000 and a polystyrene content of 30.3%. by weight. V1100 is a tackifying resin which contains about 16.6 percent by weight aromaticity.

The formulations are shown in Table 10 and the results are shown in Table 11. All of the films except for the one with Polymer 2 were somewhat hazy in appearance. The films were evaluated for 180° peel values and the film thickness was also measured. This is shown in Table 11.

TABLE 10

| Formulation | 9A | 9B | 9C | 9D | 9E |
|---|---|---|---|---|---|
| Polymer 2 | 10 | — | — | — | — |
| Polymer 6 | — | 10 | — | — | — |
| Polymer 7 | — | — | 10 | — | — |

TABLE 10-continued

| Formulation | 9A | 9B | 9C | 9D | 9E |
|---|---|---|---|---|---|
| Polymer 8 | — | — | — | 10 | — |
| Polymer 9 | — | — | — | — | 10 |
| Polymer 3 | 16 | 16 | 16 | 16 | 16 |
| Polymer 4 | 18 | 18 | 18 | 18 | 18 |
| V1100 | 56 | 56 | 56 | 56 | 56 |
| UVI 6974 | 0.2 | 0.2 | 0.2 | 0.2 | 0.2 |

TABLE 11

| Formulation | 180° Peel | Film Thickness, mils |
|---|---|---|
| Polymer 2 | 9.4 a | 5.3 |
| Polymer 6 | 9.8 a | 6.4 |
| Polymer 7 | 10.2 a | 5.2 |
| Polymer 8 | 7.3 a | 5.2 |
| Polymer 9 | 8.2 a | 5.6 |

We claim:

1. A formulation for curable strippable adhesive and coating films and high performance adhesives which comprises:
   (a) from 10 to 90 percent by weight of a crosslinkable epoxidized diene polymer,
   (b) from 0 to 70 percent by weight of a diene mono-ol polymer, with the condition that the mono-ol polymer not exceed three times the weight of the epoxidized polymer,
   (c) from 5 to 40 weight percent of a block copolymer of a vinyl aromatic hydrocarbon and a diene having, on average, more than one vinyl aromatic hydrocarbon block per molecule, wherein the amount of vinyl aromatic hydrocarbon in the block copolymer is less than 30% by weight, and wherein the block copolymer can optionally be functionalized by grafting onto it from 0.1 to 5% by weight of a carboxylic acid or anhydride,
   (d) from 0 to 65 percent by weight of a tackifying resin, and
   (e) from 0.01 to 3 percent by weight of a photoinitiator.

2. The formulation of claim 1 wherein the epoxidized diene polymer is a monohydroxylated polydiene polymer having the formula $$(HO)_x\text{—}A\text{—}S_z\text{—}B\text{—}(OH)_y \tag{I}$$

wherein A and B are polymer blocks suitable for epoxidation which may be homopolymer blocks of conjugated diolefin monomers, copolymer blocks of conjugated diolefin monomers, or copolymer blocks of diolefin monomers and monoalkenyl aromatic hydrocarbon monomers; and wherein the A blocks have a greater concentration of more highly substituted aliphatic double bonds than the B blocks have; and wherein the A blocks have a number average molecular weight of from 100 to 6000 g/mol and the B blocks have a number average molecular weight of from 1000 to 15,000 g/mol; and wherein S is a vinyl aromatic hydrocarbon block having a number average molecular weight of from 100 to 10,000; and wherein x and y are 0 or 1 and either x or y must be 1 but only one at a time can be 1; and wherein z is 0 or 1; and wherein the monohydroxylated polydiene polymer has been epoxidized.

3. The formulation of claim 2 wherein the epoxidized diene polymer contains from 0.1 to 7.0 milliequivalents of epoxide functionality per gram of polymer.

4. The formulation of claim 1 wherein the block copolymer is a linear block copolymer of the formula:

$$A\text{—}B\text{—}A\text{—}D$$

wherein A is a vinyl aromatic hydrocarbon polymer block having a weight average molecular weight of from 4000 to 35,000, B is a hydrogenated polydiene polymer block having a weight average molecular weight of from 20,000 to 200,000, D is a hydrogenated or unhydrogenated polydiene polymer block having a weight average molecular weight of from 3000 to 50,000, and the copolymer has a vinyl aromatic hydrocarbon content of from 9 to 35 percent by weight.

5. The formulation of claim 1 wherein the amount of tackifying resin is from 40 to 65 percent by weight.

6. A formulation for curable strippable adhesive and coating films and high performance adhesives which comprises:
   (a) from 10 to 90 percent by weight of a crosslinkable epoxidized diene polymer,
   (b) from 0 to 70 percent by weight of a diene mono-ol polymer, with the condition that the mono-ol polymer not exceed three times the weight of the epoxidized polymer,
   (c) from 5 to 40 percent of a block copolymer of a vinyl aromatic hydrocarbon and a diene having, on average, more than one vinyl aromatic hydrocarbon block per molecule, wherein the amount of vinyl aromatic hydrocarbon in the block copolymer is from 30% to 50% by weight, and wherein the block copolymer can optionally be functionalized by grafting onto it from 0.1 to 5% by weight of a carboxylic acid or anhydride,
   (d) from 5 to 65 percent by weight of a tackifying resin which has an aromaticity of from 2 to 20 percent by weight, and
   (e) from 0.01 to 3 percent by weight of a photoinitiator.

7. The formulation of claim 6 wherein the epoxidized diene polymer is a monohydroxylated polydiene polymer having the formula $$(HO)_x\text{—}A\text{—}S_z\text{—}B\text{—}(OH)_y \tag{I}$$

wherein A and B are polymer blocks suitable for epoxidation which may be homopolymer blocks of conjugated diolefin monomers, copolymer blocks of conjugated diolefin monomers, or copolymer blocks of diolefin monomers and monoalkenyl aromatic hydrocarbon monomers; and wherein the A blocks have a greater concentration of more highly substituted aliphatic double bonds than the B blocks have; and wherein the A blocks have a number average molecular weight of from 100 to 6000 g/mol and the B blocks have a number average molecular weight of from 1000 to 15,000 g/mol; and wherein S is a vinyl aromatic hydrocarbon block having a number average molecular weight of from 100 to 10,000; and wherein x and y are 0 or 1 and either x or y must be 1 but only one at a time can be 1; and wherein z is 0 or 1; and wherein the monohydroxylated polydiene polymer has been epoxidized.

8. The formulation of claim 7 wherein the epoxidized diene polymer contains from 0.1 to 7.0 milliequivalents of epoxide functionality per gram of polymer.

9. The formulation of claim 6 wherein the block copolymer is a linear block copolymer of the formula:

$$A\text{—}B\text{—}A\text{—}D$$

wherein A is a vinyl aromatic hydrocarbon polymer block having a weight average molecular weight of from 4000 to 35,000, B is a hydrogenated polydiene polymer block having a weight average molecular weight of from 20,000 to 200,000, D is a hydrogenated or unhydrogenated polydiene polymer block having a weight average molecular weight of from 3000 to 50,000, and the copolymer has a vinyl aromatic hydrocarbon content of from 9 to 35 percent by weight.

10. The formulation of claim 6 wherein the amount of tackifying resin is from 20 to 40 percent by weight and the aromaticity of the tackifying resin is from 3 to 10% by weight.

* * * * *